United States Patent [19]

Block et al.

[11] Patent Number: 5,136,707

[45] Date of Patent: Aug. 4, 1992

[54] RELIABLE DATABASE ADMINISTRATION ARRANGEMENT

[75] Inventors: Frederick P. Block, Westminster; Norman C. Chan, Louisville, both of Colo.

[73] Assignee: AT&T Bell Laboratories, Murray Hill, N.J.

[21] Appl. No.: 264,283

[22] Filed: Oct. 28, 1988

[51] Int. Cl.$^5$ ............................................. G06F 15/401
[52] U.S. Cl. ............................. 395/600; 364/DIG. 1
[58] Field of Search .............. 364/300, 200 MS File, 364/900 MS File; 395/600; 371/21.6

[56] References Cited

U.S. PATENT DOCUMENTS

| | | | |
|---|---|---|---|
| 4,432,057 | 2/1984 | Daniell et al. | 364/300 |
| 4,631,673 | 12/1986 | Haas et al. | 364/300 |
| 4,686,620 | 8/1987 | Ng | 364/200 |
| 4,710,870 | 12/1987 | Blackwell et al. | 364/200 |
| 4,714,992 | 12/1987 | Gladney et al. | 364/200 |
| 4,714,995 | 12/1987 | Materna et al. | 364/200 |
| 4,714,996 | 12/1987 | Gladney et al. | 364/300 |
| 4,745,559 | 5/1988 | Willis et al. | 364/514 |
| 4,747,130 | 5/1988 | Ho | 379/269 |
| 4,752,910 | 6/1988 | Yen et al. | 395/680 |
| 4,774,661 | 9/1988 | Kumpati | 364/900 |
| 4,897,782 | 1/1990 | Bennett et al. | 364/200 |
| 5,043,866 | 8/1991 | Myre, Jr. et al. | 371/12 |

FOREIGN PATENT DOCUMENTS

| | | |
|---|---|---|
| 0216535 | 1/1987 | European Pat. Off. . |
| 0230616 | 8/1987 | European Pat. Off. . |

OTHER PUBLICATIONS

Lai et al., "Broadcast Database Systems", *The 7th International Conference on Distributed Computing Systems* (Sep. 21-25, 1987, West Berlin, FRG) pp. 408-415.

T. Endo et al., "Concept of the Visual Information Response and Communication Processing System", *Review of the Electrical Communications Laboratories*, vol. 36, No. 1 (1988, Tokyo, Japan) pp. 1-6.

*Primary Examiner*—Michael R. Fleming
*Assistant Examiner*—Debra A. Chun
*Attorney, Agent, or Firm*—David Volejnicek

[57] ABSTRACT

In a distributed system, such as a PBX (FIG. 1), which uses a database for its operation, a master copy (22) of the database having a first format is stored at a central node (10) and cache copies (32) of database portions (24) but having a different format are stored at peripheral nodes (11-12). A change to the database is made to the master copy, is recorded in a change table (26) corresponding to the affected database portion, and is sent to affected peripheral nodes. At initialization, a boot copy (25) is made of each database portion by translating the database portion from the master database format to the cache copy format. Periodically thereafter, each boot copy is replaced with a new boot copy that reflects changes presently recorded in the corresponding change table. When the new boot copy is generated, the present change table contents are erased. When a peripheral node calls for a new cache copy (e.g., upon reboot), it is sent the corresponding boot copy and any changes presently recorded in the corresponding change table.

29 Claims, 4 Drawing Sheets

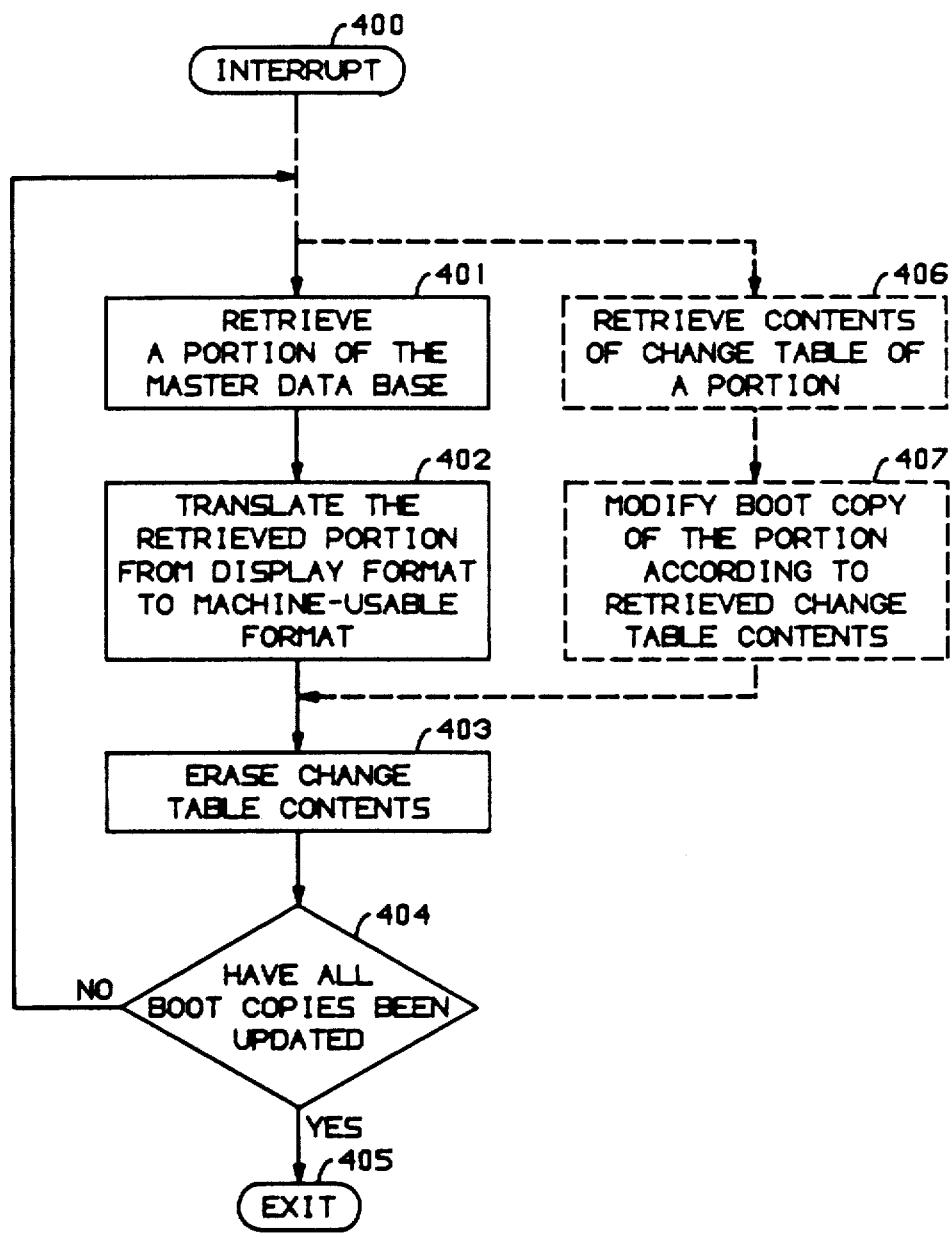

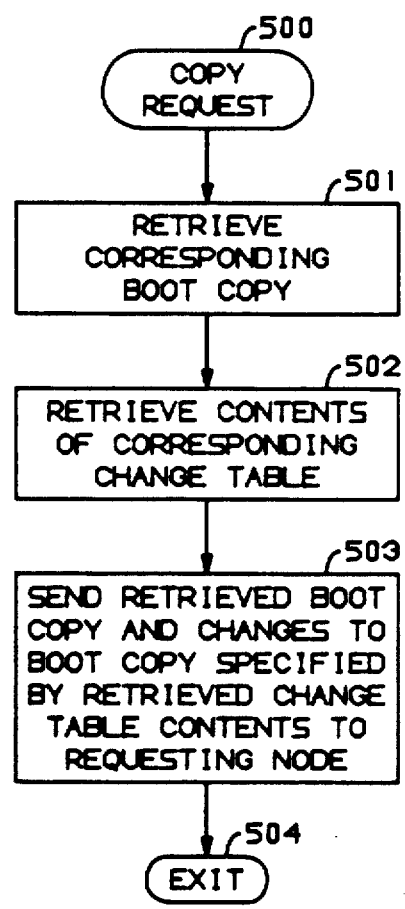

RELIABLE DATABASE ADMINISTRATION ARRANGEMENT

TECHNICAL FIELD

The invention relates generally to database systems, and in particular relates to the administration of distribution of copies of portions of a database from a central node to peripheral nodes of a distributed processing system.

BACKGROUND OF THE INVENTION

Distributed processing systems—ones comprising a plurality of processing entities or locations, referred to herein as nodes—often depend upon a database for their operation. Illustrative examples of such systems are a multiprocessor computer that stores operational data in a database, and a distributed switching system, such as a PBX with remote modules, that stores call processing translations in a database.

To avoid known difficulties associated with using either a fully-distributed or a fully-centralized database architecture, distributed processing systems often favor a database architecture which is intermediate between the two above-mentioned extremes: one wherein a "master" copy of the database is located at one, a central, node that manages the database centrally, but where "cache" copies of portions of the database are maintained locally at the other, peripheral, nodes. The peripheral nodes then communicate with the central node to obtain database information when that information is not in the local cache copy, and when updating their cache copies.

In distributed systems making use of this database architecture, the loss by a peripheral node of its database cache copy can adversely affect system performance. Such loss occurs, for example, if the peripheral node stores the cache copy in a volatile memory, such as a semiconductor memory, and it loses power to that memory. Even if the peripheral node stores the information in nonvolatile memory, such as a disk, it may lose the cache copy due to a node or a disk malfunction that multilates the data in the cache copy. In the event of such a loss, the peripheral node must obtain a fresh cache copy from the central node. The time spent by the central node in providing this fresh copy, and the time spent by the peripheral node in awaiting the fresh copy, is time taken away from the nodes' normal activities. In particular, when the cache copies and the master database do not have the same format, it is very time-consuming for the central node to translate the requisite database portion from "master" copy format—such as a format suitable for operator retrieval and display—into "cache" copy format—one suitable for transmission to the peripheral node and storage and use by the peripheral node. Hence, system performance suffers. It is therefore desirable to minimize the time spent in providing a peripheral node with a cache copy of the database.

SUMMARY OF THE INVENTION

The invention is directed to satisfying this desire of the prior art. According to the invention, a peripheral node of a distributed system is provided with a new cache copy of a portion of the database not directly from the master database, but from a separate, "boot", copy of a version of the cache copy that existed at some prior point in time, supplemented by a record of the changes that must be made to the boot copy to bring it up-to-date, i.e., to make it consistent with, the master database. The boot copy has the same format as the cache copy, but has a format different from that of the master database. An arrangement according to the invention maintains a database that has a plurality of modifiable—e.g., updateable—portions. The portions have some particular format. The arrangement stores a record of changes, or modifications, that have been made to the database portions. The arrangement also generates boot copies of the database portions. The boot copies have a format that is different from the format of the database portions. Illustratively, generation of a boot copy involves translation of the database portion from the database's format—such as a display format—into the "cache copy" format—such as a machine-useable format. The arrangement responds to a request from a requester for a database portion by sending to the requester the boot copy corresponding to the requested portion and the presently-stored record of modifications made to the requested portion. Illustratively, the arrangement characterized above is located at a central node of a distributed system, while cache copies of the database portions are located at peripheral nodes of the system, and requests for database portions are requests by the peripheral nodes to the central node for new cache copies of the database portions.

Because requests for database portions are satisfied by sending boot copies plus modifications, and not the database portions themselves, satisfaction of the requests avoids searching the master database itself for the desired portion and then translating the desired portion from master database format into the cache copy format; as mentioned above, the boot copies are "pre-translated". Hence, the requests can be satisfied with much less work, and more rapidly, thereby improving real-time response and operational efficiency.

Preferably there is a storage facility, such as a table, associated with or corresponding to each database portion, and that storage facility records changes, or modifications, that have been made to the associated database portion. The arrangement responds to modifications of a database portion by making a record of the modification in the storage facility that corresponds to the modified portion. This feature avoids having to spend time searching through a common record of changes made to all database portions to select changes that were made to a particular portion. System performance is enhanced thereby.

Also preferably, the arrangement occasionally generates new, updated, boot copies. The new boot copies represent the old boot copies modified with the presently-recorded modifications to the database. However, for reliability purposes, the new boot copies are preferably generated not by modifying the old boot copies, but are generated anew from the database portions by translating anew the database portions. When it generates the new boot copies, the arrangement deletes the records of the modifications to the old boot copies that are represented in the new boot copies. Preferably, the generation of the new boot copies is undertaken by the arrangement when it does not have more pressing work to do. The generation of the new boot copies therefore does not adversely impact the performance of the arrangement; what it does do is improve the performance of the requesters of new cache copies, who are saved thereby from the effort of incorporating the changes into the old boot copies themselves.

These and other advantages and features of the invention will become more apparent from the following description of an illustrative embodiment of the invention considered together with the drawing.

BRIEF DESCRIPTION OF THE DRAWINGS

FIG. 4 is a flow diagram of database manager actions taken to periodically generate new boot copies of database portions; and FIG. 5 is a flow diagram of database manager actions taken to supply system nodes with new copies of database portions.

DETAILED DESCRIPTION

Figure 1:
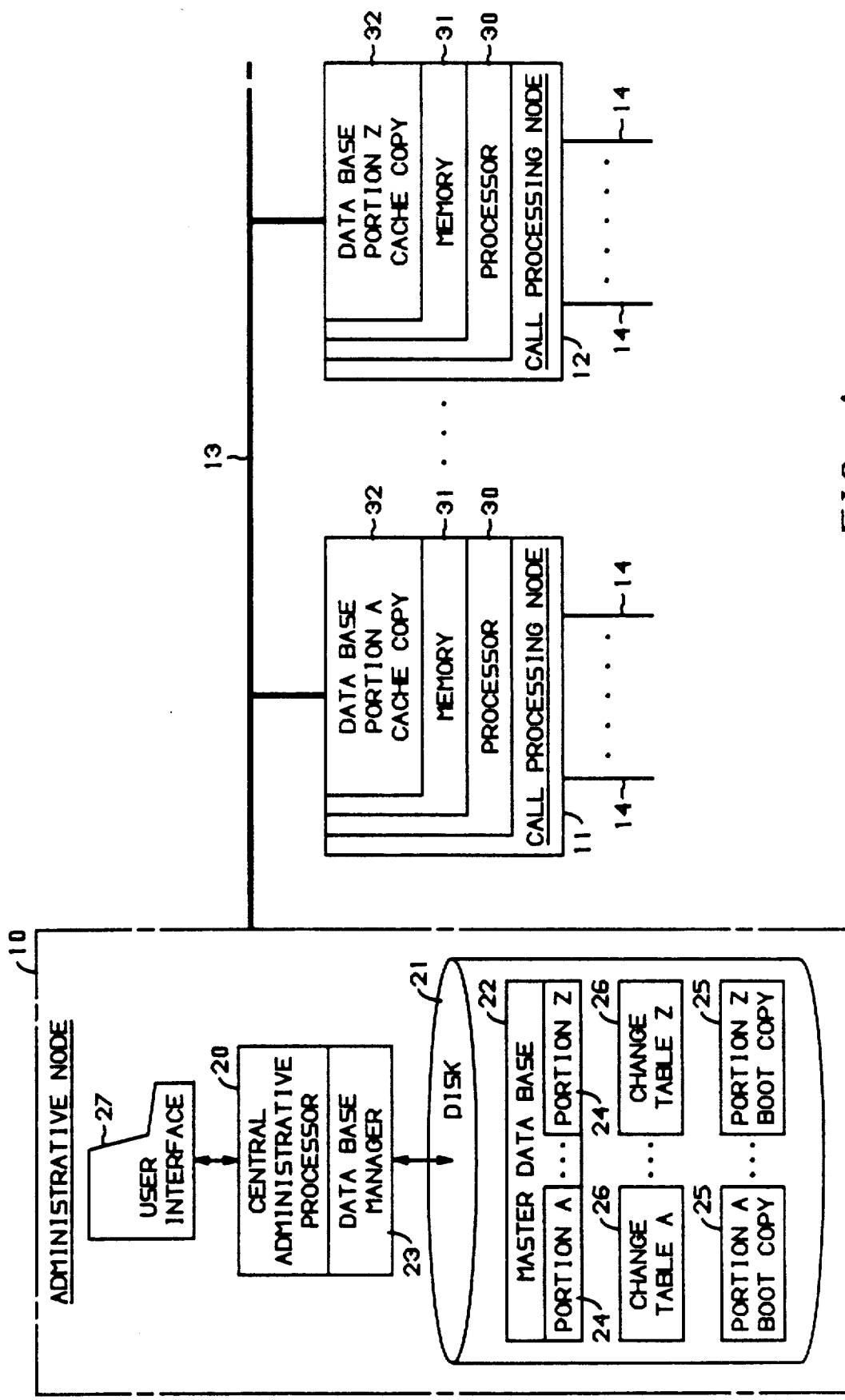
FIG. 1 is a block diagram of a distributed PBX including an illustrative embodiment of the invention.

FIG. 1 shows a distributed telephony switching system such as a private branch exchange (PBX). The switching system comprises a central, administrative, node 10 and a plurality of peripheral, call processing, nodes 11-12 interconnected by a communication medium. Each peripheral node 11-12 is connected to customers via communication links 14 which are, for example, telephone lines or trunks. Peripheral nodes 11-12 provide conventional call processing functions for their connected customers, whereas central node 10 provides specialized system-wide functions, such as call records and billing. Such systems are well known in the art. An example thereof is the IBM multi-module 9751 CBX.

Administrative node 10 includes a central administrative processor 20 connected to a non-volatile mass storage medium such as a disk 21. Processor 20 stores on disk 21 a master copy of a system managenment database, referred to herein as a master database 22. Database 22 includes call processing translations that peripheral nodes 11-12 need to perform their call processing functions. Database 22 is managed, i.e., controlled and maintained, by a database manager 23 program executing on processor 20.

A user interface 27, such as a computer terminal, is connected to processor 20. Inter alia, interface 27 enables an operator to inform database manager 23 of changes to database 22, so that manager 23 can keep database 22 up-to-date. For example, when a new customer is connected to the system of FIG. 1, or when an old customer changes location, and hence its connection to the system, an operator informs manager 23 of these changes through interface 27, so that manager 23 may update the call processing translations in database 22 accordingly.

Each peripheral node 11-12 includes a processor 30 for performing call processing functions. Each processor 30 includes a memory 31 in which it stores call processing programs and call processing translations. These translations are a part of master database 22. Because each node 11-12 serves different customers, each processor 30 typically requires different translations. Hence, the memory 31 of each processor 30 typically stores a different portion of database 22. The database portions stored in peripheral nodes 11-12 are referred to as cache copies 32 of the database portions. In the example of FIG. 1, master database 22 is shown as comprising a plurality of portions 24 designated A to Z, and each of the peripheral nodes 11-12 is shown as having a cache copy 32 of one of the portions 24, such that node 11 includes a cache copy 32 of database portion A and node 12 includes a cache copy 32 of database portion Z.

Associated with each master database portion 24 is a boot copy 25 of the portion, and a change table 26. Illustratively, boot copies 25 and change tables 26 are also stored on disk 21, although they may be stored in any non-volatile memory in the system. A boot copy 25 is a copy of the cache copy 32 of the corresponding master database portion 24 which was created at some past point in time. Hence, boot copy 25 is a potentially-outdated copy that does not necessarily reflect the present, updated, contents of portion 24. A change table 26 is a stored record of all changes, updates, that have been made to a portion 24 since the corresponding boot copy 25 was created.

Database manager 23 uses boot copies 25 and change tables 26—as opposed to master database portions 24—to re-create lost or mutilated cache copies 32 in peripheral nodes 11-12. The administration and use of boot copies 25 and change tables 26 is diagrammed in FIGS. 2-5.

Figure 2:
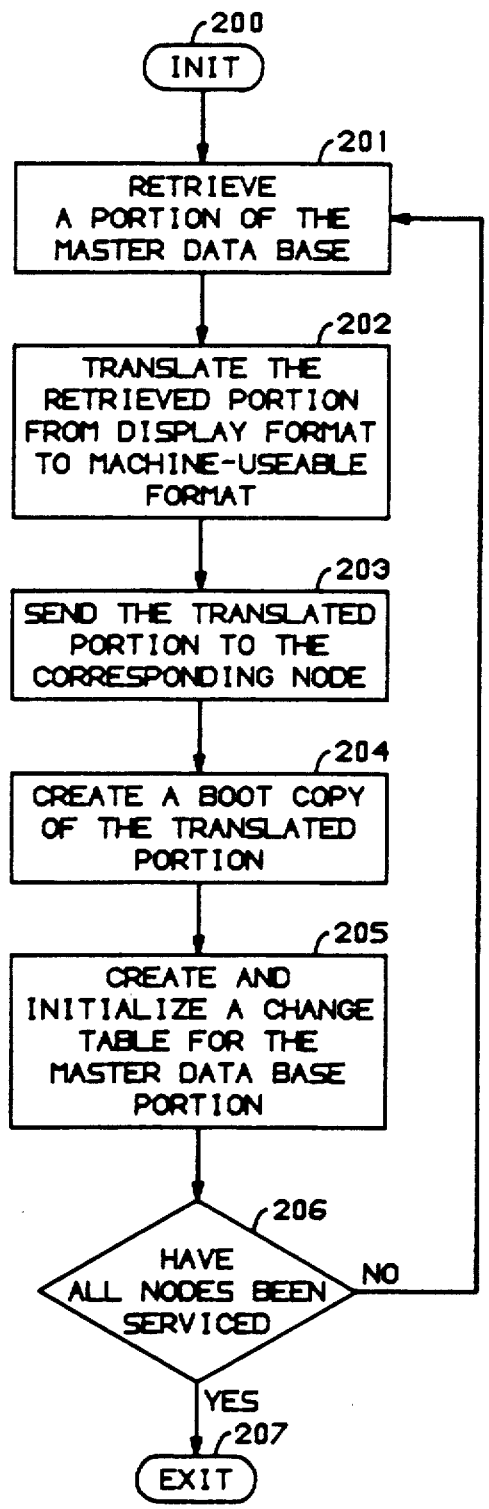
FIG. 2 is flow diagram of actions of the database manager of the PBX of FIG. 1 upon system initialization.

FIG. 2 shows activities of database manager 23 upon system initialization. In response to an initialization command, received at step 200, manager 23 retrieves a portion 24 of master database 22 from disk 21, at step 201. Master database 22 is stored in a format suitable for display to, and interaction with, an operator at user interface 27, not in machine-useable format. Manager 23 therefore translates the retrieved portion from the display format to a machine-useable format, at step 202. Manager 23 then sends the translated portion to a corresponding peripheral node 11-12, at step 203. The sent copy becomes the cache copy 32 at the receiving peripheral node 11-12. Manager 23 also creates a boot copy 25 of that same translated copy of master database portion 24, at step 204, by copying the translated information into a new—the boot copy—file. Furthermore, manager 23 creates and initializes—clears—a change table for that portion 24, at step 205. Manager 23 then checks whether all peripheral nodes 11-12 have been serviced, at step 206. If not, manager 23 returns to step 201 to service another node 11-12 and to provide it with a copy of its corresponding database portion. If all nodes 11-12 have been serviced, manager 23 exits, at step 207.

Figure 3:
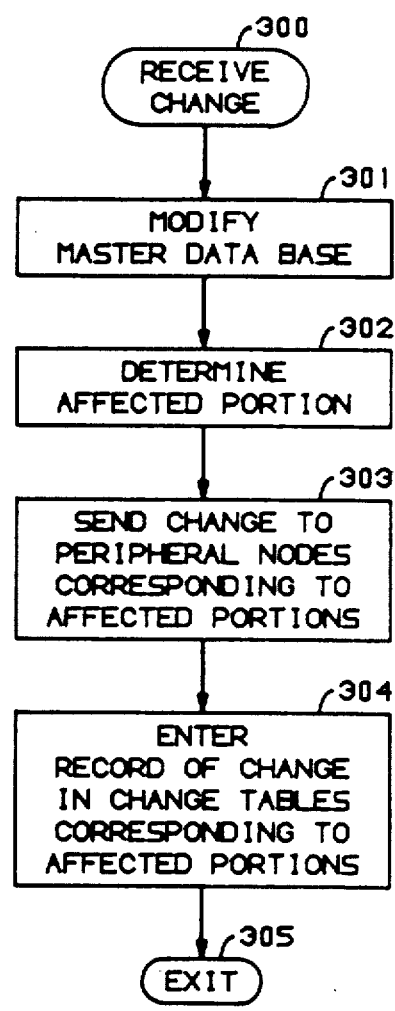
FIG. 3 is a flow diagram of database manager actions in response to a database change.

FIG. 3 shows activities of database manager 23 upon receipt of a change to the contents of master database 22, such as from user interface 27. In response to receiving the change, at step 300, manager 23 enters the change in master database 22, thereby modifying the contents of database 22, at step 301. Manager 23 also determines which portions 24 were affected by this change, i.e., the contents of which portions 24 were modified, at step 302. Manager 23 then sends the change to the peripheral nodes 11-12 which store cache copies 32 of the affected portions 24, at step 303. The receiving nodes 11-12 enter the change in their cache copies 32. Having completed the change, manager 23 enters a record of the change in change tables 26 which correspond to portions 24 which were affected by the change, at step 304, and exits, at step 305.

FIG. 4 shows activities performed by database manager 23 to update boot copies 25. Periodically—for example, upon the timing out of an operating system timer—database manager 23 is issued an interrupt indicating that it is time to update boot copies 25. This is a low-priority interrupt, and hence manager 23 may not respond to it immediately upon receiving it, at step 400. When higher-priority work has been completed, manager 23 responds to the interrupt by duplicating the first two steps 201-202 of FIG. 2 to generate a new boot copy 25 of a database portion 24, at steps 401-402, respectively.

This is the functional equivalent of retrieving the contents of a change table 26 corresponding to a first database portion 24 and modifying the present boot copy 25 of the database portion 24 by making the changes indicated by the retrieved contents of change table 26, as shown in FIG. 4 by the dotted-line steps 406 and 407. However, conversion of a portion 24 into a boot copy 25 may possibly introduce error into the boot copy 25. For reliability purposes—to prevent these errors from propagating—the approach of steps 406-407 is not favored, and the approach of steps 401-402 is used instead.

New boot copy 25 is caused at steps 401-402 or steps 406-407 to reflect the present, up-to-date, contents of the corresponding database portion 24. The record of the changes is no longer needed, so manager 23 erases—zeroes out—the contents of change table 26 which corresponds to the newly-updated boot copy 25, at step 403. Manager 23 then checks if all boot copies 25 have been updated, at step 404. If not, manager 23 returns to step 401 to update another boot copy 25. If all boot copies 25 have been updated, manager 23 exits, at step 405.

Memories 31 of peripheral nodes 11-12 typically are volatile memories. Hence, whenever power to a memory is lost, its contents are lost. Furthermore, memories 31 illustratively have no local back-up. Hence, whenever the contents of a memory 31 become lost or mutilated, a replacement therefor is not locally available. In either case, a new cache copy 32 of the database portion contents of memory 31 must be obtained from a source of such information, which in this example is administrative node 10.

FIG. 5 shows the activities performed by database manager 23 to supply a peripheral node 11-12 with a new cache copy 32 of a database portion. In response to receiving a request from a node 11-12 for a new copy of a database portion 24, at step 500, manager 23 retrieves boot copy 25 that corresponds to the requested portion 24, at step 501. Manager 23 also retrieves the contents of change table 26 that corresponds to the requested portion 24, at step 502. Manager 23 then sends the retrieved boot copy 25, and the changes to the boot copy 25 that are specified by the retrieved change table 26 contents, to the requesting node 11-12, at step 503. Manager 23 then exits, at step 504. The requesting node 11-12 receives the sent boot copy 25 and the changes, and creates therefrom a new cache copy 32.

Of course, it should be understood that various changes and modifications to the illustrative embodiment described above will be apparent to those skilled in the art. For example, change tables 26 and boot copies 25 need not be stored at administrative node 10, but may be stored anywhere in the system, such as at an independent database node, or in back-up storage of call processing nodes 11-12 when such storage is provided. Also, administrative node 10 may also serve as a call processing node and have its own cache copy 32 of its corresponding database portion 24. Such changes and modifications can be made without departing from the spirit and the scope of the invention and without diminishing its attendant advantages. It is therefore intended that all such changes and modifications be covered by the following claims.

We claim:
1. An apparatus comprising:
   means for modifying a database having a plurality of modifiable portions, the portions having a first format;
   means for storing records of modifications made to the database portions;
   means for generating boot copies of the database portions, the boot copies having a second format; and
   means responsive to a request from a requester for a database portion, for sending to the requester the boot copy of the requested portion and the presently-stored records of modifications made to the requested portion.
2. The apparatus of claim 1 further comprising:
   means for occasionally generating a new boot copy of a database portion based on then-present contents of that portion and for deleting previously-stored records of modifications made to that portion.
3. The apparatus of claim 1 wherein
   the means for generating boot copies include
   means for translating the database portions from the first format to the second format.
4. An apparatus comprising:
   a database having a plurality of modifiable portions having a first format;
   a plurality of storage means connected to the database, each corresponding with a different one of the database portions, each for storing records of modifications made to the corresponding database portion;
   memory means connected to the database for storing a plurality of boot copies of the database portions, each boot copy corresponding with a different one of the database portions and having a second format different from the first format;
   means connected to the plurality of storage means and responsive to modification of a database portion, for making a record of the modification in the storage means corresponding to the modified database portion; and
   means connected to the plurality of storage means and to the memory means, responsive to a request from a requester for a cache copy of a database portion, for sending to the requester the boot copy of the requested portion and the modifications presently recorded in the storage means corresponding to the requested portion.
5. The apparatus of claim 4 further comprising:
   means for occasionally generating a new boot copy of a database portion, the new boot copy reflecting modifications presently recorded in the storage means corresponding to that database portion, and for deleting from the storage means corresponding to a database portion the records of the modifications reflected in the boot copy of that database portion.
6. The apparatus of claim 5 wherein a boot copy initially comprises an up-to-date copy of the corresponding database portion.
7. The apparatus of claim 5 wherein the boot copy generating means include means for translating the database portions from the first format to the second format.

8. The apparatus of claim 4 further comprising:
cache copies of the database portions each maintained by a requester, the cache copies having the second format; and
means responsive to a modification of a database portion, for notifying of the modification the cache copy of the database portion.

9. A distributed system comprising:
a plurality of system portions interconnected for communications;
a database having a plurality of portions and stored in a first system portion, the database portions having a first format;
cache copies of the database portions stored in a plurality of the system portions, the cache copies having a second format;
means connected to the database in the first system portion for making changes in the database portions;
a plurality of storage means in the first system portion each corresponding with a different one of the database portions, each for storing records of changes made to the corresponding database portion;
a plurality of boot copies of the database portions stored in the first system portion, each corresponding with a different one of the database portions, the boot copies having the second format;
means connected to the plurality of storage means in the first system portion and responsive to the change making means, for making a record of a change in a database portion in the storage means corresponding to the modified database portion, and for notifying of the change the system portion at which a cache copy of the database portion is located;
means connected to the plurality of boot copies in the first system portion, for occasionally regenerating a boot copy to reflect in the boot copy changes that are presently recorded in the storage means corresponding to a same database portion as the boot copy, and for deleting from that storage means the records of the changes that were reflected in the regenerated boot copy; and
means located at the first system portion and responsive to a request from a system portion for a new cache copy of a database portion, for sending to the requesting system portion the boot copy of the requested portion and the changes presently recorded in the storage means corresponding to the requested portion.

10. The system of claim 9 wherein the boot copy regenerating means include means for translating the database portion from the first format to the second format.

11. The system of claim 9 wherein the regenerating means comprise means for occasionally making changes that are presently recorded in the storage means corresponding to a database portion in the boot copy of that database portion.

12. The system of claim 9 wherein the regenerating means comprise means for replacing a boot copy of a database portion with a new boot copy that is formed from the corresponding database portion as modified by the change making means.

13. A method of administering a database by a database manager means, the database having plurality of modifiable portions, the portions having a first format, comprising the steps of:
generating boot copies of the database portions, the boot copies having a second format;
modifying a database portion;
storing a record of the modification; and
sending to a requester the boot copy of a requested portion and the presently-stored records of modifications made to the requested portion, in response to a request from the requester for the database portion.

14. The method of claim 13 further comprising the step of:
occasionally generating a new boot copy of a database portion based on then-present contents of that portion; and
deleting previously-stored records of modifications made to that portion.

15. The method of claim 13 wherein
the step of generating boot copies includes the step of translating the database portion from the first format to the second format.

16. A method of administering a database by a database manager means, the database having a plurality of modifiable portions, comprising the steps of:
(A) making a boot copy of each of the database portions, the database portions having a first format and the boot copies having a second format different from the first format;
(B) modifying a database portion;
(C) making a record of the modification in a storage means corresponding to the modified database portion;
(D) repeating steps B and C; and
(E) in response to a request from a requester for a database portion, sending to the requester the boot copy of the requested portion and the modifications presently recorded in the storage means corresponding to the requested portion.

17. The method of claim 16 further comprising the steps of:
(F) occasionally generating a new boot copy of a database portion to reflect in the new boot copy modifications presently recorded in the storage means corresponding to that database portion; and
(G) deleting from the storage means corresponding to a database portion the records of the modifications reflected in the boot copy of that database portion.

18. The method of claim 16 wherein step (A) includes the step of:
translating each of the database portions from the first format into the second format.

19. The method of claim 16 in an apparatus having a first node including the database and a plurality of other nodes including cache copies of the database portions, the method further comprising the step of:
in response to modifying a database portion, notifying the node at which a cache copy of the database portion is located of the modification.

20. The method of claim 16 in an apparatus having a first node including the database and a plurality of other nodes, the method further comprising the steps of:
initially sending cache copies of the database portions to the other nodes for storage at the other nodes; and in response to modifying a database portion, notifying the node at which a cache copy of the database portion is located of the modification.

21. The method of claim 17 wherein the step (F) comprises the step of occasionally modifying the boot copy of a database portion with modifications presently recorded in the storage means corresponding to that database portion.

22. The method of claim 17 wherein the step (F) comprises the step of replacing a boot copy of a database portion with a new boot copy that is formed from the corresponding database portion as modified by any preceding step (B).

23. The method of claim 17 wherein the step (F) comprises the step of
translating the database portion from the first format into the second format.

24. An apparatus comprising:
means for modifying a database having a plurality of modifiable portions;
means for storing records of modifications made to the database portions;
means for occasionally generating and storing boot copies of the database portions; and
means responsive to a request from a requester for a database portion, for sending to the requester the stored boot copy of the requested database portion and the stored records of modifications that have been made to the requested database portion since the stored boot copy was generated.

25. The apparatus of claim 24 further comprising:
means for occasionally generating a new boot copy of a database portion based on then-present contents of that database portion and for deleting previously-stored records of modifications made to that database portion.

26. The apparatus of claim 24 wherein
the means for generating boot copies include
means for translating the database portions from a format of the database to a different format.

27. A method of administering a database by a database manager means, the database having a plurality of modifiable portions, comprising the steps of:
occasionally generating and storing boot copies of the database portions;
modifying a database portion;
storing a record of the modification; and
sending to a requester the stored boot copy of a requester database portion and the stored records of modifications that have been made to the requested database portion since the stored boot copy was generated, in response to a request from the requester for the database portion.

28. The method of claim 27 further comprising the step of:
occasionally generating a new boot copy of a database portion based on then-present contents of that database portion; and
deleting previously-stored records of modifications made to that database portion.

29. The method of claim 27 wherein
the step of generating boot copies includes the step of translating the database portion from a format of the database to a different format.

* * * * *